Figure 1:
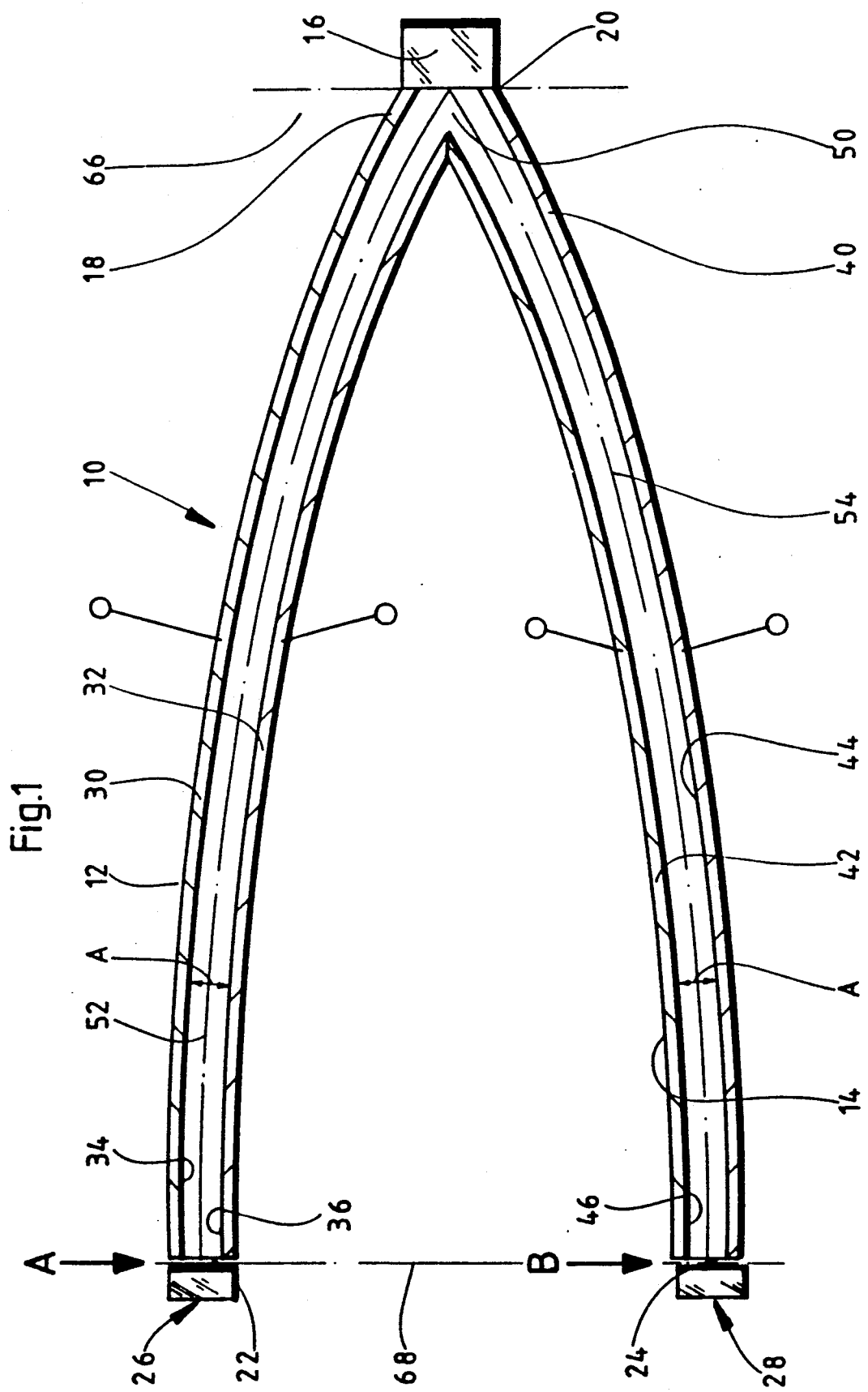

United States Patent [19]
Opower

[11] Patent Number: 5,097,479
[45] Date of Patent: Mar. 17, 1992

[54] FOLDED WAVEGUIDE LASER

[75] Inventor: Hans Opower, Krailling, Fed. Rep. of Germany

[73] Assignee: Deutsche Forschungsanstalt fuer Luft- und Raumfahrt e.V., Fed. Rep. of Germany

[21] Appl. No.: 635,758

[22] Filed: Dec. 28, 1990

[30] Foreign Application Priority Data

Dec. 30, 1989 [DE] Fed. Rep. of Germany ....... 3943373

[51] Int. Cl.⁵ ................................................ H01S 3/08
[52] U.S. Cl. ......................................... 372/95; 372/93; 372/64
[58] Field of Search ........................ 372/93, 95, 97, 64

[56] References Cited

U.S. PATENT DOCUMENTS

| | | | |
|---|---|---|---|
| 3,772,611 | 11/1973 | Smith | 372/64 |
| 3,970,963 | 7/1976 | Chester | 372/64 |
| 3,982,204 | 9/1976 | Andringa | 372/61 |
| 4,438,514 | 3/1984 | Chenausky et al. | 372/93 |
| 4,939,738 | 7/1990 | Opower | 372/95 |

OTHER PUBLICATIONS

*IEEE Journal of Quantum Electronics,* "Transverse Modes of Plane Mirror Waveguides", Christopher Hill, vol. 24, No. 9, Sep. 1988, pp. 1936-1946.

"Headed in the Right Direction", Fred Aronowitz, *Photonics Spectra,* Sep. 1988, pp. 135-140.

*Primary Examiner*—William L. Sikes
*Assistant Examiner*—Susan S. Morse
*Attorney, Agent, or Firm*—Barry R. Lipsitz

[57] ABSTRACT

In order to so improve a high-frequency-excited, diffusion-cooled waveguide laser comprising a folded, unstable laser resonator with a first resonator axis branch and a second resonator axis branch, a folded, optical waveguide with a first waveguide branch and a second waveguide branch penetrated by the first and the second resonator axis branch, respectively, in their longitudinal direction, and each having two spaced, optical waveguide surfaces, and at least one reflection element with a reflection surface coupling the waveguide branches with one another, that as low reflection losses as possible occur with the folding and that the laser is as compact as possible, it is proposed that the two waveguide branches be coupled with one another at a first end by a single, first reflection surface, each with single beam reflection thereat, in that the two resonator axis branches intersect at their point of impact on the first reflection surface and that the two waveguide branches be curved in the direction towards one another.

22 Claims, 7 Drawing Sheets

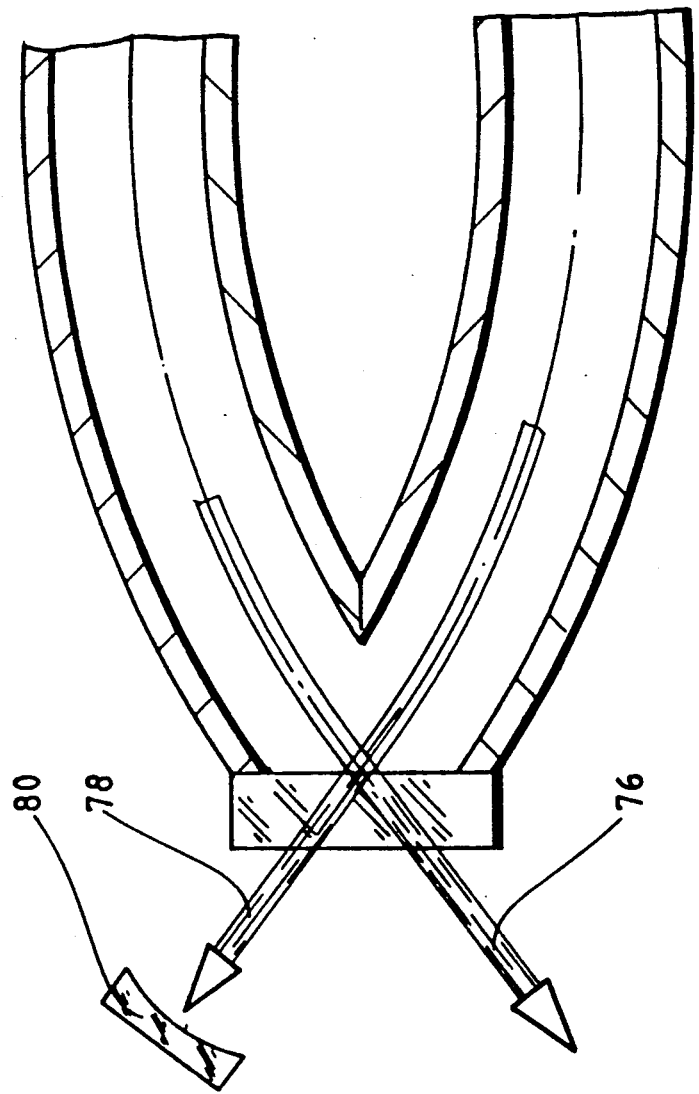

FOLDED WAVEGUIDE LASER

The invention relates to a high-frequency-excited, diffusion-cooled waveguide laser comprising a folded, unstable laser resonator with a first resonator axis branch and a second resonator axis branch, a folded, optical waveguide with a first waveguide branch and a second waveguide branch penetrated by the first and the second resonator axis branch, respectively, in their longitudinal direction and each having two spaced, optical waveguide surfaces, and at least one reflection element with a reflection surface coupling the waveguide branches with one another.

Such a high-frequency-excited, diffusion-cooled waveguide laser is known, for example, from European patent application 0 305 893.

Insofar as the embodiment described in this publication comprises two waveguide branches, these are coupled by at least two reflection elements and extend parallel to one another.

Such a configuration has the disadvantage that considerable reflection losses occur when two reflection elements are used.

The object underlying the invention is, therefore, to so improve a waveguide laser of the generic kind that as low reflection losses as possible occur with the folding and that the laser is as compact as possible.

This object is accomplished in accordance with the invention with a waveguide laser of the kind described at the beginning in that the two waveguide branches are coupled with one another at a first end by a single first reflection surface, each with single beam reflection thereat, in that the two resonator axis branches intersect at their point of impact on the first reflection surface, and in that the two waveguide branches are curved in the direction towards one another.

With the inventive solution, firstly, owing to the provision of a single reflection surface with single beam reflection, there is a reduction in the reflection losses and yet, on the other hand, this embodiment is of compact design owing to the two waveguide branches being curved in the direction towards one another and hence not extending from the reflection surface away from one another at the reflection angle and thereby having a considerable space requirement.

It is particularly advantageous within the scope of the inventive solution for the two resonator axis branches to include at their point of impact on the reflection surface an angle of between approximately 45 degrees and approximately 90 degrees. This angle is advantageous because the guidance of the radiation by the waveguide branches is worse in the region of the reflection surface with larger angles and, therefore, the reflection losses also increase, as the aim according to the invention is for the radiation to be guided on both sides by the two waveguide branches up to as near the reflection surface as possible. Guidance of the radiation on one side only by the waveguide branches in the region of the reflection surface is preferably to be tolerated only over a distance corresponding at the most to 1.5 times the spacing of the optical waveguide surfaces, which results in an admissible angle of from approximately 45 degrees to 90 degrees enclosed by the resonator axis branches.

With regard to the design of the waveguide surfaces it is advantageous for these to exhibit a width transversely to their longitudinal direction which constitutes a multiple of their spacing.

It is particularly expedient, also with respect to the design of the waveguide surfaces, for these to be carried by waveguide walls which include high-frequency electrodes, and provision is preferably made for the waveguide surfaces to be surfaces of the high-frequency electrodes which, in the simplest case, consist of metal.

It is particularly advantageous within the scope of the invention for the first reflection surface to be so arranged relative to the waveguide branches that the radiation guided by the one waveguide branch is completely reflected into the other waveguide branch.

It is particularly expedient within the scope of the inventive solution for the two first ends of the waveguide branches to extend with their waveguide surfaces facing away from one another essentially as far as the reflection surface and hence at least in this region to conduct the radiation guided by the waveguide branches as far as the reflection surface.

It is, furthermore, expedient within the scope of the inventive solution for the waveguide branches to extend in straight orientation in the region of their first ends in order to guide the radiation to the reflection surface and receive it again from the latter in straight orientation.

In a preferred embodiment of the inventive solution, provision is made for the waveguide branches to each have one resonator mirror at their second end facing away from the first reflection element.

Provision is preferably made, in this case, for the resonator mirrors arranged at the second ends of the waveguide branches to constitute the end mirrors of the resonator so the radiation is guided between the end mirrors by the waveguide branches and the reflection surface coupling these.

A particularly preferred geometrical constellation is achievable by the reflection surface extending in a plane lying parallel to an axis of curvature of the resonator mirrors.

A preferred geometrical constellation, furthermore, makes provision for the two waveguide branches to exhibit essentially the same curvature and, in particular, essentially the same length.

In another preferred embodiment of the inventive waveguide laser, provision is made for the waveguide branches to be coupled with one another at a second end opposite the first end so there is not only a coupling at the first end but also a coupling of the waveguide branches with one another at the second end.

The coupling can be implemented with any optical coupling elements. It is, however, expedient within the scope of an advantageous further development for the coupling at the second end to also be implemented by a second reflection element.

The geometrical configuration of this embodiment is preferably selected such that a ring-shaped beam path forms in the waveguide branches coupled at the first and second ends, which expediently results in a ring laser which manages with a minimum number of optical reflection elements.

In a particularly advantageous embodiment, provision is made for the two waveguide branches to be coupled with one another at the second end by a single second reflection surface, each with single beam reflection thereat, and, in particular, for the two resonator axis branches to intersect at their respective point of impact on the second reflection surface so the same reflection conditions prevail at the second end as at the first end.

In particular, the inventive configuration wherein the two waveguide branches are coupled with one another at both ends can be advantageously made to form a laser when the first reflection surface is the mirror surface of a resonator mirror so the mirror surface needed as such for the coupling simultaneously represents the mirror surface of the resonator and hence the reflection losses through mirrors are minimized.

Even more optimal is an embodiment wherein the second reflection surface is also the mirror surface of a resonator mirror and so, in a preferred embodiment, the first and the second reflection surfaces both couple the two waveguide branches with one another and simultaneously constitute resonator mirrors.

In principle, further resonator mirrors could be provided. It is, therefore, particularly expedient for the first and second reflection surfaces to constitute the two end mirrors of the resonator so that the further guidance of the radiation between these is only implemented by the waveguide branches extending between these end mirrors.

The above description of the inventive solutions contained no details as to how coupling-out is to be implemented in the inventive waveguide laser. It is particularly expedient for coupling-out to take place at one of the two mirrors. In the case of the waveguide branches coupled with one another at both ends, provision is made in the event of use of one of the reflection surfaces as end mirror and coupling-out in the region of one of these end mirrors, for this end mirror to allow two laser beams including between them the angle of the resonator axis branches at the point of impact to exit thereat, with one of the laser beams originating from the one waveguide branch and the other from the respective other waveguide branch.

However, in order not to have to couple two laser beams with one another, provision is expediently made for one of the exiting laser beams to be reflectable back by a reflection mirror which is preferably designed so as to comprise an axis of curvature parallel to the waveguide surfaces.

In the description of the embodiments hereinabove, no details were given as to the design of the unstable resonators. Provision is preferably made for the resonator to be a confocal resonator and, in particular, for the resonator mirrors to have cylindrical mirror surfaces.

Furthermore, provision is made in an advantageous configuration for the resonator to be a cylinder resonator which is symmetrical with the resonator axis, but this does have the disadvantage that laser beams exit on both sides of the waveguides.

For this reason, provision is made in a further improved, advantageous embodiment for the resonator to extend on one side of the resonator axis as the half of a cylinder resonator symmetrical with the resonator axis.

Details have also not been given as to the arrangement of the beam path in the waveguide branches. In a preferred embodiment, provision is made for the resonator to have a beam path which extends at the most over the width of the waveguide branches with optimum use being made of the width of the waveguide branches when the beam path of the resonator extends substantially over the width of the waveguide surfaces transversely to their longitudinal direction.

Furthermore, provision is preferably made for a laser beam exiting from the resonator to extend parallel to the resonator axis as advantageous geometrical relations are, in this case, obtained in the adaptation of the beam path to the waveguides and vice-versa.

Figure 2:
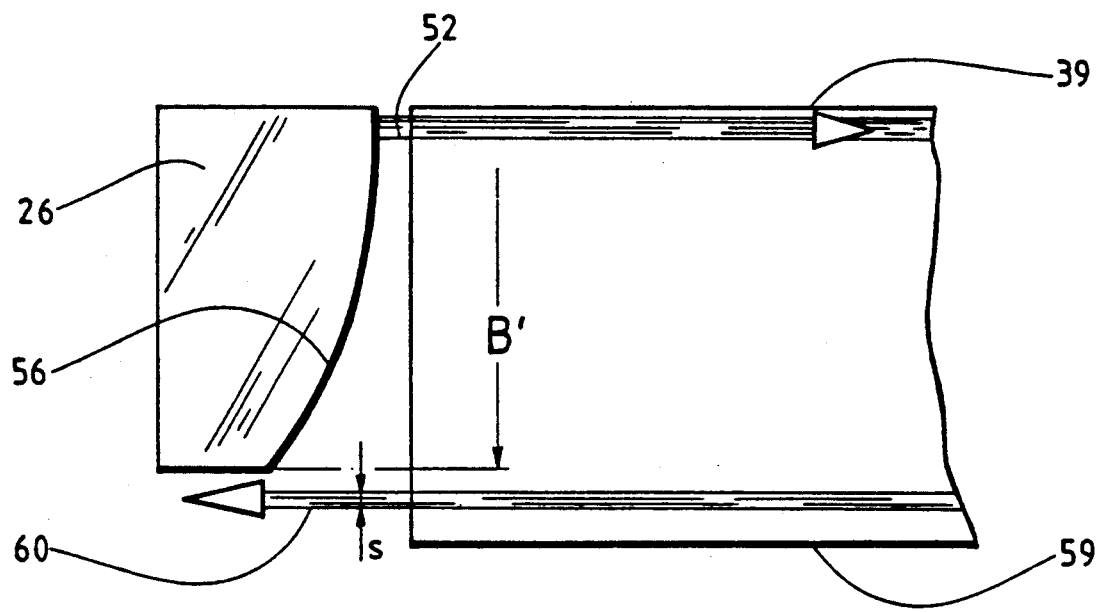
Figure 3:
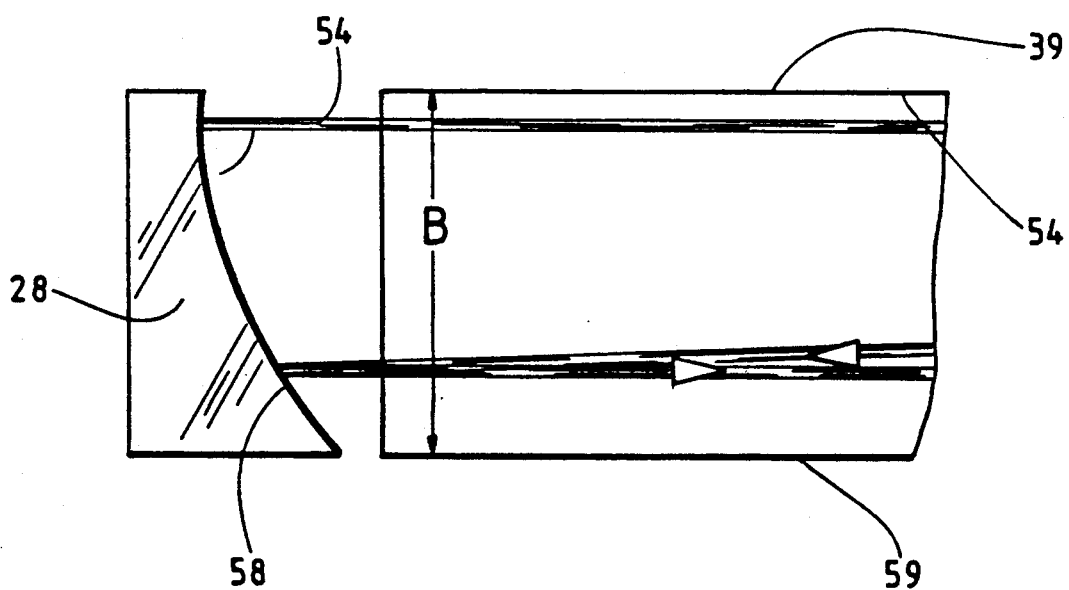
Figure 4:
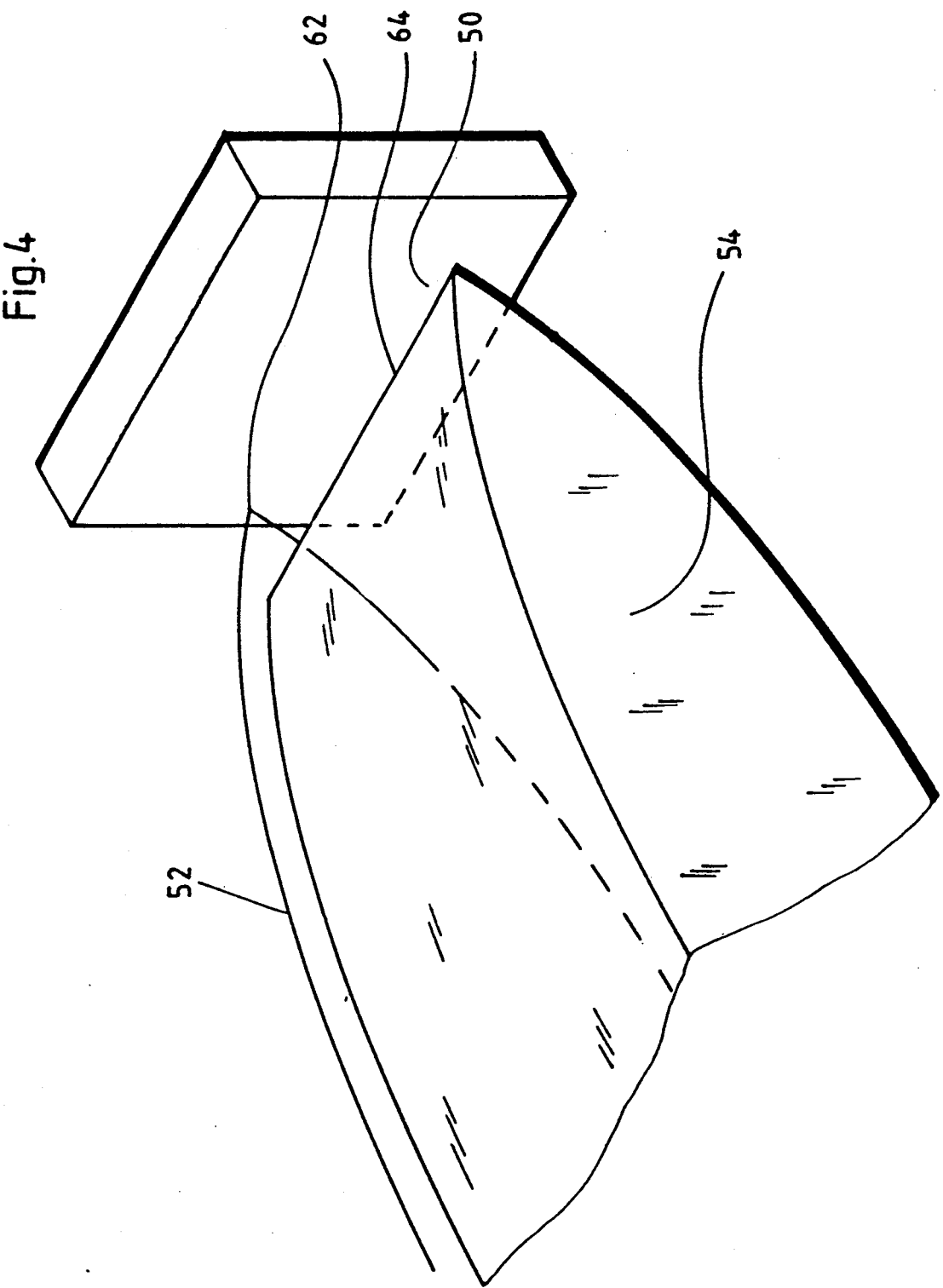
Figure 5:
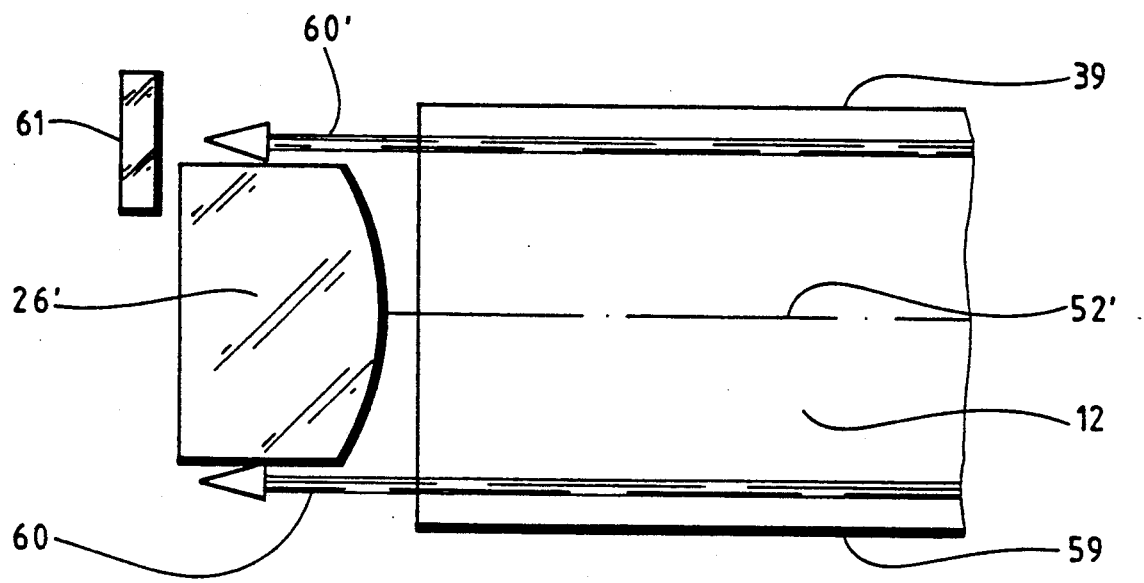
Figure 6:
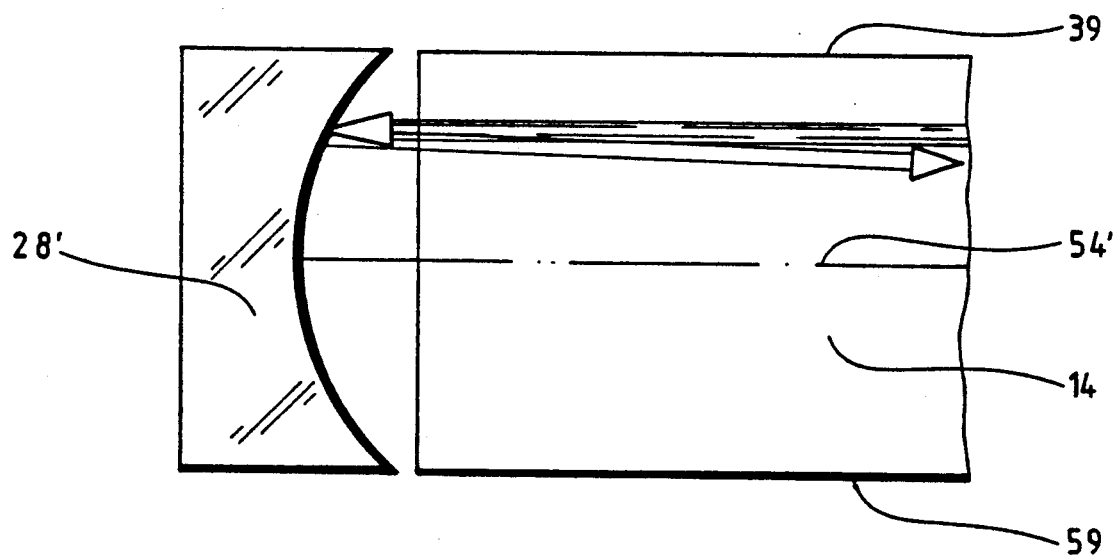
Figure 7:
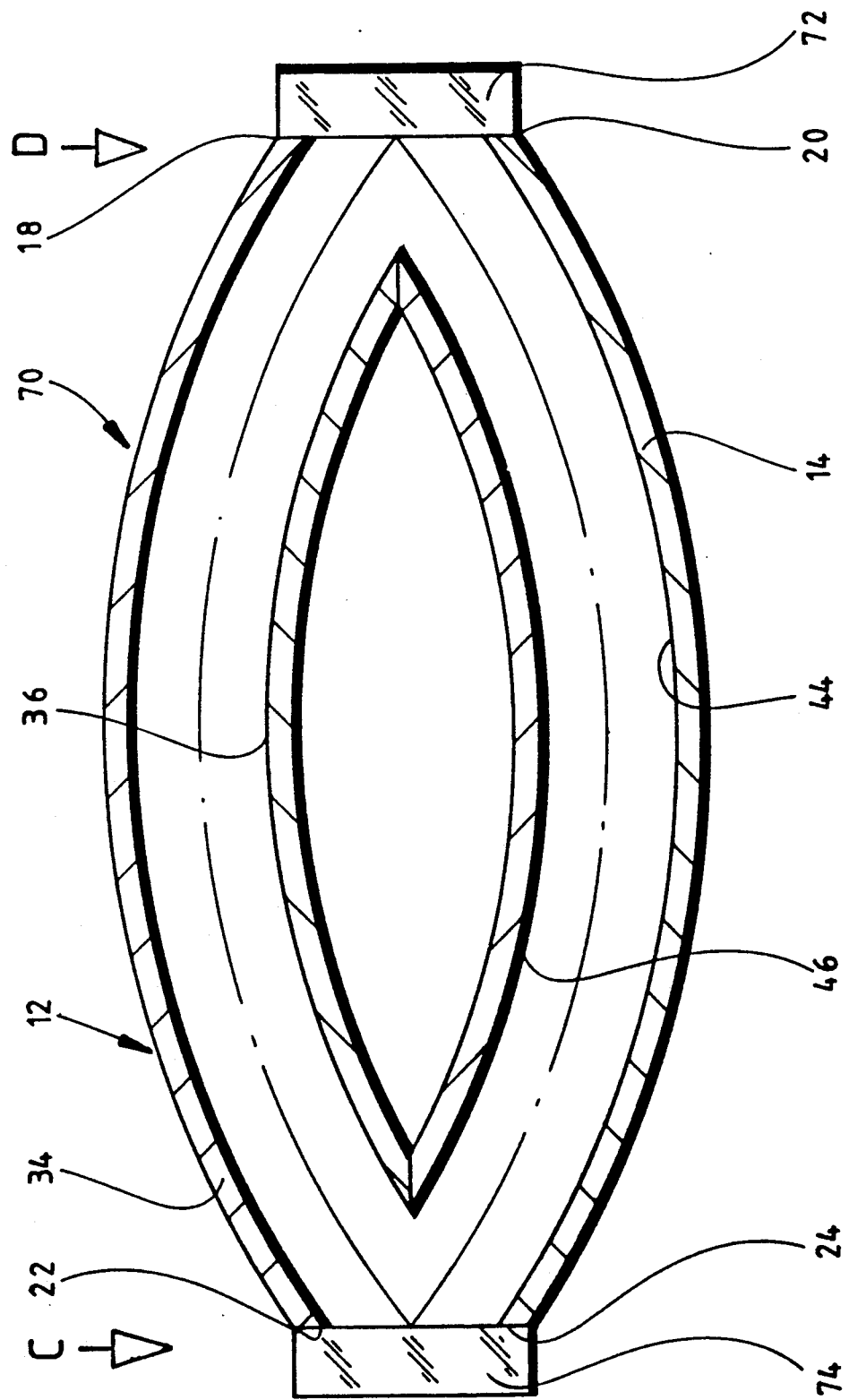
Figure 8:
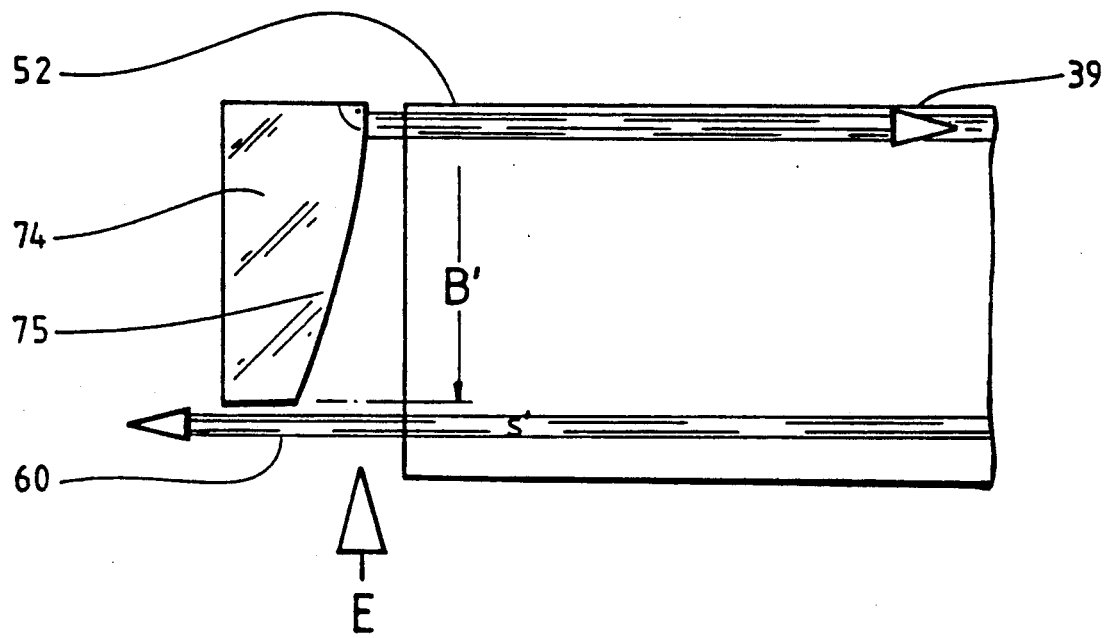
Figure 9:
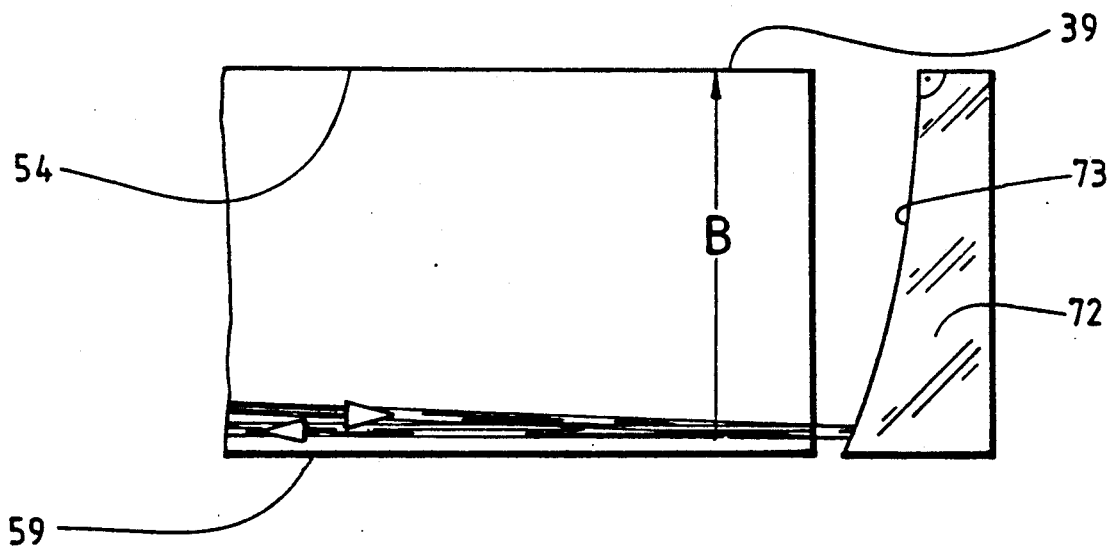

Further features and advantages of the invention are to be found in the following description and in the appended drawings of several embodiments. The drawings show:

FIG. 1 a longitudinal section through a first embodiment of an inventive waveguide laser;

FIG. 2 a plan view in the direction of arrow A in FIG. 1;

FIG. 3 a plan view in the direction of arrow B in FIG. 1;

FIG. 4 a partial, perspective illustration of the geometrical relations in the reflection region between the two waveguide branches;

FIG. 5 an illustration similar to FIG. 2 of a variant of the first embodiment;

FIG. 6 an illustration similar to FIG. 3 of the variant of the first embodiment according to FIG. 5;

FIG. 7 a longitudinal section through a second embodiment;

FIG. 8 a plan view of the second embodiment in the direction of arrow C;

FIG. 9 a plan view of the second embodiment in the direction of arrow D; and

FIG. 10 a plan view of the second embodiment in the direction of arrow E in FIG. 8.

A first embodiment, designated in its entirety 10, of an inventive high-frequency-excited, diffusion-cooled waveguide comprises a first waveguide branch, designated in its entirety 12, and a second waveguide branch, designated in its entirety 14, which are arranged in V-shaped configuration relative to one another and each have a first end 18 and 20, respectively, which lie adjacent to one another and with which they face a reflection mirror 16 which couples the two waveguide branches 12 and 14 with one another in the region of the first ends 18 and 20 and hence unites the two waveguide branches 12 and 14 to a common waveguide.

The second ends 22 and 24, respectively, of the first and second waveguide branches 12 and 14, respectively, facing away from the first ends 18 and 20, respectively, are closed off by a first and a second resonator mirror 26 and 28, respectively. The two resonator mirrors 26 and 28 are end mirrors of a resonator whose beam is guided by the first waveguide branch 12, the reflection mirror 16 and the second waveguide branch 14 between the first resonator mirror 26 and the second resonator mirror 28.

The first waveguide branch 12 which forms an optical waveguide suited for the laser radiation wavelength of the resonator comprises, in relation to the V-shaped arrangement of the waveguide branches 12 and 14, an outer wall 30 and an inner wall 32 which form an outer waveguide surface 34 and an inner waveguide surface 36, respectively, which face one another and extend at the same spacing A from one another. Both the outer waveguide surface 34 and the inner waveguide surface 36 stand perpendicular on a plane 38 laid out by the two waveguide branches 12 and 14, in particular by the same side rim 39 thereof.

In the same way, the second waveguide branch comprises an outer wall 40 and an inner wall 42 which likewise have an outer waveguide surface 44 and an inner waveguide surface 46 and extend at the same spacing A parallel to and facing one another. These waveguide surfaces 44 and 46 also stand perpendicular on the plane 38.

Both waveguide branches 12 and 14 extend from their first ends 18 and 20, respectively, not in a straight direction away from the reflection mirror 16 but in a curved direction towards one another so the two ends 22 and 24 lie as close to one another as possible.

The outer waveguide surface 34 and the inner waveguide surface 36 of the first waveguide branch 12 thereby continue to extend at the same spacing A from one another and likewise also the outer waveguide surface 44 and the inner waveguide surface 46 of the second waveguide branch 14.

The resonator which is defined by the two resonator mirrors 26 and 28 and whose beam is guided by the first waveguide branch 12, the reflection mirror 16 and the second waveguide branch 14 has a resonator axis which extends with a first resonator axis branch 52 from the first resonator mirror 26 to a reflection surface 50 of the reflection mirror 16 and from this reflection surface 50 with a second resonator axis branch 54 to the second resonator mirror 28.

Owing to the curvature of the waveguide surfaces 34, 36, 44, 46, the resonator axis branches 52 and 54 also extend in the same way as the waveguide surfaces 34 and 36 and 44 and 46, respectively, in curved configuration.

The resonator mirrors 26 and 28 are the two mirrors of a confocal, unstable resonator which constitutes the half of a symmetrical, unstable resonator that lies on one side of the resonator axis. The first resonator mirror 26 has a convexly curved mirror surface 56 facing the first waveguide branch 12 and the second resonator mirror 28 a concavely curved mirror surface 58 facing the second waveguide branch 14 and both mirror surfaces 56, 58 extend at the point of impact of the respective resonator axis branch 52, 54 perpendicular to the latter. Since the resonator is to constitute the half of an instable, symmetrical, confocal resonator, the resonator axis branches 52 and 54 lie on the same side of the resonator mirrors 26 and 28 and preferably extend in the region of one of the side rims 39, 59 of the waveguide branches 12 and 14, preferably along the side rim 39 of the waveguide branches 12 and 14.

Starting from the resonator axis branches 52 and 54, the mirror surfaces 56 and 58 then extend in the direction of the opposite side rim 59, with the second resonator mirror 28 extending substantially over the entire width B of the second waveguide branch 14 while the first resonator mirror only extends over a partial width B' of the first waveguide branch 12, thereby leaving free an opening S which extends as far as the side rim 59 opposite the side rim 39 and through which an exiting laser beam 60 leaves the first waveguide branch 12.

In principle, the two resonator mirrors 26 and 28 thereby jointly form together with the two waveguide branches 12 and 14 located therebetween a laser with a beam path which is, for example, the subject matter of European laid open paper 0 305 893, to which reference is made in full with regard to the basic design of the beam path between the resonator mirrors 26 and 28.

The reflection mirror 16 is so arranged in the region of the first ends 18 and 20 that the first resonator axis branch 52 penetrating the first waveguide branch 12 hits the reflection surface 50 at a point 62 and that the second resonator axis branch 54 penetrating the second waveguide branch 14 hits the reflection surface 50 likewise at the point 62 and so both resonator axis branches 52 and 54 hit the reflection surface 50 at this point 62. Since the resonator axis branches 52 and 54, as described hereinabove, extend along the side rim 39 of the waveguide branches 12 and 14, the point 62 likewise lies in the plane 38 laid out by the side rims 39 (FIG. 4).

Furthermore, the reflection surface 50 is so arranged that its surface normal 65 represents the bisecting line of the angle of the resonator axis branches 52 and 54 in the region of the point of impact 62.

The reflection mirror 16 is also so arranged that it reflects all of the rays impinging on the reflection surface 50 near the outer waveguide surface 34 of the first waveguide branch 12 such that these continue in the second waveguide branch 14 near the inner waveguide surface 46 and all of the rays impinging on the reflection surface 50 near the outer waveguide surface 44 of the second waveguide branch 14 continue after the reflection along the inner waveguide surface 36 of the first waveguide branch 12.

The two inner walls 32 and 42 of the first and second waveguide branches 12 and 14, respectively, are preferably joined such that the inner waveguide surfaces 36 and 46 meet along an edge 64 extending at a constant spacing from the reflection surface 50.

In particular, in the first embodiment, the reflection surface 50 is so arranged that it lies in a plane 66 which likewise stands perpendicular on the plane 38.

Furthermore, the mirror surfaces 56 and 58 are preferably designed as cylindrical mirror surfaces which extend perpendicular to the waveguide surfaces 34 and 36 and 44 and 46, respectively, at the two ends 22 and 24, respectively. An arrangement is particularly expedient wherein the mirror surfaces 56 and 58 each have an axis of curvature which extends parallel to the respective other axis of curvature and, in particular, parallel to the plane 66.

Moreover, the beam path of the resonator laid out by the resonator mirrors 26 and 28 is fixed such that it extends over the entire width B of the respective waveguide branches 12 and 14 which have the same width B or at least lies within the side rims 39 and 59 thereof.

In a variant of the first embodiment 10, the configuration of the waveguide branches 12 and 14 and of the reflection mirror 16 relative to one another is the same as in the first embodiment and so for a description of these, reference is to be had to the statements on the first embodiment in which the same reference numerals are used.

In constrast with this, however, the resonator is a symmetrical, confocal resonator and so the resonator axis branches 52' and 54' extend approximately half-way between the side rims 39 and 59 of the waveguide branches 12 and 14, respectively, and meet the resonator mirrors 26' and 28' approximately at the center thereof. The resonator mirrors 26' and 28' extend with their convex and concave curvature, respectively, on both sides of the resonator axis.

With such a symmetrical, confocal resonator, in addition to the laser beam 60 near the side rim 59, a laser beam 60' exits on the opposite side near the side rim 39 of the first waveguide branch 12 from the latter so two laser beams 60 and 60' are available.

In a preferred variant, provision is made for the laser beam 60' to impinge on a return reflection mirror 61 and to be reflected from this back into the respective waveguide branch.

In the first embodiment and in the variant thereof, the laser gas is arranged in a non-flowing manner between the waveguide surfaces 34 and 36 and 44 and 46, respectively, and is only cooled by the diffusion and the interaction with the waveguide surfaces 34 and 36 and 44 and 46, respectively.

The walls 30, 32 and 42, 44 are preferably made of metal which reflects the laser radiation and simultaneously act as electrodes for the high-frequency excitation of the laser gas enclosed between these, with, for example, the inner walls 32 and 42 being jointly connected with a first connection and the outer walls 30 and 40 jointly with a second connection of a high-frequency wave.

In a second embodiment illustrated in FIGS. 7 to 10, insofar as the same parts are used as in the first embodiment, these bear the same reference numerals and so for a description of these, reference is to be had to the statements on the first embodiment. The second embodiment also comprises a first waveguide branch 12 and a second waveguide branch 14 which likewise have waveguide surfaces 34 and 36 and 44 and 46, respectively, arranged at a constant spacing A from one another and, in principle, are designed in the same way as the waveguide branches 12 and 14 of the first embodiment.

The waveguide branches 12 and 14 are also coupled in the region of their first ends 18 and 20, respectively, by a reflection element 72 in the same way as in the first embodiment.

In contrast with the first embodiment, the waveguide branches 12 and 14 of the second embodiment 70 are coupled with one another in the region of their second ends 22 and 24, respectively, by a reflection element 74.

As illustrated in FIGS. 8 and 9, these two reflection elements 72 and 74 are designed as the two resonator mirrors of an unstable, optical, preferably an unstable, confocal resonator. The resonator represents the half of an unstable, confocal resonator that lies on the one side of the resonator axis and so the resonator axis branches 52 and 54 extend along the side rim 39 of the waveguide branches 12 and 14 and the reflection element 74 is designed as a convex mirror with a correspondingly curved mirror surface 75, similarly to that of the resonator mirror 26 of the first embodiment, while the reflection element 72 is designed as the concave mirror of the unstable resonator with a correspondingly curved mirror surface 73, similarly to that of the resonator mirror 28 of the first embodiment, so the reflection element 72 extends over the entire width B of the waveguide branches 12 and 14 between the side rims 39 and 59, while the reflection element 74 extends over a partial width B' only and leaves an opening S' free adjacent to the side rim 59 so radiation can exit past the reflection element 74.

As illustrated in FIG. 10, two bundles of rays leave the resonator, namely a first beam 76 exiting from the first waveguide branch 12 and a second beam 78 exiting from the second waveguide branch 14, and each propagate in the continuation of the respective waveguide branch 12 and 14.

In the second embodiment 70, in order to use only one exiting laser beam, for example, the first laser beam, a return reflection mirror 80 is preferably provided to reflect the second beam 78 back again into the second waveguide branch 14 so it again enters the unstable resonator comprised of the resonator mirrors 72 and 74 and is reflected back and forth until it can exit in the form of the first beam 76.

The return reflection mirror 80 is preferably concavely curved, in particular cylindrical with an axis of curvature which stands perpendicular on the plane 38 laid out by the waveguide branches 12 and 14.

Hence a ring laser system based on an optically unstable resonator is created by the second embodiment 70, with only the two reflection elements 72 and 74 being necessary and these simultaneously constituting the mirrors of the unstable, preferably confocal, optical resonator so there is a minimum of mirror losses.

The statements in connection with the first embodiment also apply to the arrangement of the reflection elements 72 and 74. In particular, exactly as in the first embodiment, these are to be so arranged that the radiation arriving from the one waveguide branch 12, 14 is completely reflected into the respective other waveguide branch 14, 12 and hence the entire radiation guided by the one waveguide branch 12, 14 is coupled into the respective other waveguide branch 14, 12.

Reference is also to be had to the statements on the first embodiment with regard to the design of the waveguide branches 12 and 14 in the modification of the instable resonator, the arrangement and cooling of the laser gas and the excitation of the laser gas.

The present disclosure relates to the subject matter disclosed in German application No. P 39 43 373.0 of Dec. 30, 1989, the entire specification of which is incorporated herein by reference.

What is claimed is:

1. High-frequency-excited, diffusion-cooled waveguide laser comprising a folded, unstable laser resonator with a first resonator axis branch and a second resonator axis branch, a folded, optical waveguide with a first waveguide branch and a second waveguide branch penetrated by said first and said second resonator axis branch, respectively, in their longitudinal direction, each waveguide branch having two spaced, optical waveguide surfaces and said two waveguide branches being curved in the direction towards one another, an excitable laser gas between said optical waveguide surfaces, at least one reflection element with a single reflection surface, said single reflection surface coupling said waveguide branches with one another at a first end by single beam reflection at said reflection surface and said two resonator axis branches intersecting at their point of impact on said reflection surface, at least one reflection element being arranged at a second end of said waveguide branches and a laser output beam exiting at one of said ends.

2. Waveguide laser as defined in claim 1, characterized in that said two resonator axis branches (52, 54) include with one another at their point of impact (62) on said reflection surface (50, 73) an angle of between approximately 45 degrees and approximately 90 degrees.

3. Waveguide laser as defined in claim 1, characterized in that said first reflection surface (50, 73) is so arranged relative to said waveguide branches (12, 14) that the radiation guided by one waveguide branch (12, 14) is completely reflected into said other waveguide branch (14, 12).

4. Waveguide laser as defined in claim 1, characterized in that the two first ends (18, 20) of said waveguide branches (12, 14) extend with their waveguide surfaces (34, 44) facing away from one another essentially as far as said reflection surface (50, 73).

5. Waveguide laser as defined in claim 1, characterized in that said waveguide branches (12, 14) extend in straight orientation in the region of their first ends (18, 20).

6. Waveguide laser as defined in claim 1, characterized in that said waveguide branches (12, 14) each have one resonator mirror (26, 28) at their second ends (22, 24) facing away from said first reflection element (16, 72).

7. Waveguide laser as defined in claim 6, characterized in that said resonator mirrors (26, 28) arranged at said two ends (22, 24) of said waveguide branches (12, 14) constitute the end mirrors of said resonator.

8. Waveguide laser as defined in claim 1, characterized in that said reflection surfaces (50, 73) extend in a plane (66) which lies parallel to an axis of curvature of said resonator mirrors (26, 28).

9. Waveguide laser as defined in claim 1, characterized in that said waveguide branches (12, 14) are coupled with one another at a second end (22, 24) opposite said first end (18, 20).

10. Waveguide laser as defined in claim 9, characterized in that the coupling at said second end (22, 24) is implemented by a second reflection element (74).

11. Waveguide laser as defined in claim 9, characterized in that a ring-shaped beam path forms in said waveguide branches (12, 14) coupled at said first and second ends (18, 20, 22, 24).

12. Waveguide laser as defined in claim 10, characterized in that said two waveguide branches (12, 14) are coupled with one another at said second end (22, 24) by a single, second reflection surface (75), each with single beam reflection thereat.

13. Waveguide laser as defined in claim 12, characterized in that said two resonator axis branches (52, 54) intersect at their respective point of impact on said second reflection surface (75).

14. Waveguide laser as defined in claim 1, characterized in that said first reflection surface (73) is the mirror surface of a resonator mirror (72).

15. Waveguide laser as defined in claim 9, characterized in that said second reflection surface (75) is the mirror surface of a resonator mirror (74).

16. Waveguide laser as defined in claim 14, characterized in that said first and said second reflection surfaces (73, 75) are formed by said two end mirrors (72, 74) of said resonator.

17. Waveguide laser as defined in claim 16, characterized in that coupling-out takes place at one of said two end mirrors (74).

18. Waveguide laser as defined in claim 17, characterized in that said end mirror (74) allows two laser beams (76, 78) including between them the angle of said resonator axis branches (52, 54) at the point of impact to exit thereat.

19. Waveguide laser as defined in claim 18, characterized in that one of said exiting laser beams (78) is reflected back by a reflection mirror (80).

20. Waveguide laser as defined in claim 1, characterized in that said resonator is a confocal resonator.

21. Waveguide laser as defined in claim 1, characterized in that said resonator mirrors (26, 28, 72, 74) have cylindrical mirror surfaces (56, 58, 73, 75).

22. Waveguide laser as defined in claim 1, characterized in that said resonator extends on one side of said resonator axis (52, 54) as the half of an unstable resonator symmetrical with said resonator axis (52, 54).

* * * * *